United States Patent
Ham et al.

(10) Patent No.: US 8,282,558 B2
(45) Date of Patent: Oct. 9, 2012

(54) ULTRASOUND SYSTEM AND METHOD FOR ULTRASOUND DATA

(75) Inventors: Jeong Ho Ham, Seoul (KR); Ra Young Yoon, Seoul (KR); Moo Ho Bae, Seoul (KR)

(73) Assignee: Medison Co., Ltd., Kangwon (KR)

( * ) Notice: Subject to any disclaimer, the term of this patent is extended or adjusted under 35 U.S.C. 154(b) by 174 days.

(21) Appl. No.: 12/772,097

(22) Filed: Apr. 30, 2010

(65) Prior Publication Data

US 2010/0280380 A1  Nov. 4, 2010

(30) Foreign Application Priority Data

Apr. 30, 2009  (KR) .................. 10-2009-0038479
Apr. 28, 2010  (KR) .................. 10-2010-0039290

(51) Int. Cl.
*A61B 8/14* (2006.01)

(52) U.S. Cl. ........ 600/447; 600/437; 600/455; 600/459; 382/154

(58) Field of Classification Search .................. 600/437, 600/447, 455, 459; 382/154
See application file for complete search history.

(56) References Cited

U.S. PATENT DOCUMENTS

| 5,278,757 | A | * | 1/1994 | Hoctor et al. | 600/459 |
| 6,016,285 | A | * | 1/2000 | Wright et al. | 367/11 |
| 6,494,842 | B2 | * | 12/2002 | Bae | 600/447 |
| 6,997,876 | B2 | * | 2/2006 | Mo et al. | 600/455 |
| 7,356,178 | B2 | * | 4/2008 | Ziel et al. | 382/154 |
| 2001/0051772 | A1 | * | 12/2001 | Bae | 600/447 |
| 2007/0084289 | A1 | | 4/2007 | Thomas et al. | |
| 2008/0255454 | A1 | | 10/2008 | Bae | |

FOREIGN PATENT DOCUMENTS

| JP | 2003-220059 A | 8/2003 |
| JP | 2008-259863 | 10/2008 |
| JP | 2009-515145 | 4/2009 |

OTHER PUBLICATIONS

Korean Office Action issued in Korean Patent Application No. KR 10-2010-0039290 dated Jul. 18, 2011.
Korean Notice of Allowance issued in Korean Patent Application No. 10-2010-0039290, dated Nov. 30, 2011.

* cited by examiner

*Primary Examiner* — Tse Chen
*Assistant Examiner* — Baisakhi Roy
(74) *Attorney, Agent, or Firm* — McDermott Will & Emery LLP

(57) ABSTRACT

An ultrasound system and method for forming ultrasound data corresponding to a receive scan line independent of a synthetic aperture. The ultrasound system includes the ultrasound data forming unit configured to: form scan line data corresponding to each of the receive scan lines by using data provided from the receive channels; form accumulated data by accumulating the scan line data corresponding to the receive scan lines of the same position; set a storing start position for storing the accumulated data based on the transmit synthesizing number; and store the accumulated data by shifting the storing start position by 1, thereby forming ultrasound data corresponding to each of the receive scan linen lines.

15 Claims, 10 Drawing Sheets

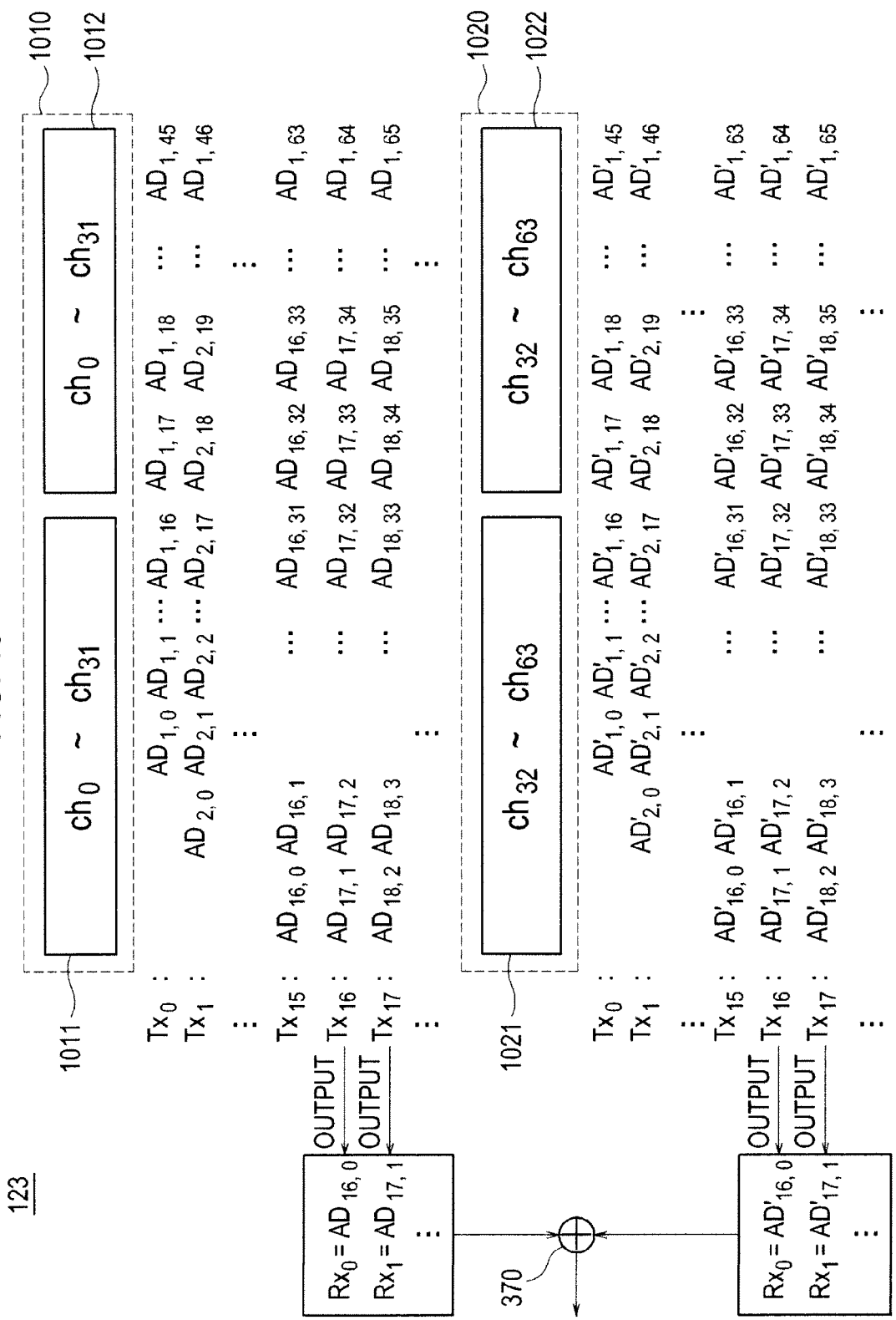

ULTRASOUND SYSTEM AND METHOD FOR ULTRASOUND DATA

CROSS-REFERENCE TO RELATED APPLICATIONS

The present application claims priority from Korean Patent Application Nos. 10-2009-0038479 (filed on Apr. 30, 2009) and 10-2010-0039290 (filed on Apr. 28, 2010), the entire subject matters of which are incorporated herein by reference.

TECHNICAL FIELD

The present disclosure generally relates to an ultrasound system and method for forming ultrasound data, and more particularly to a system and method for forming ultrasound data independent of a synthetic aperture.

BACKGROUND

Ultrasound systems have been extensively used in the medical field due to the systems non-invasive and non-destructive nature. Specifically, in the ultrasound system, there is no need to perform any surgical operation procedures. Using the ultrasound system allows a medical professional to see the inside of a target object as a high-resolution video image to facilitate operations. As such, the ultrasound system has become very popular in the medical field.

The ultrasound system transmits ultrasound signals to the target object by using an ultrasound probe. The ultrasound probe has a plurality of transducer elements and can receive ultrasound signals (ultrasound echo signals) reflected from the target object, which then forms an ultrasound image showing the inside of the target object.

To improve the resolution of the ultrasound image, a plurality of array type transducer elements are used. Using a number of the transducer elements prevents the ultrasound signal from being diffused compared to using a single transducer element. As such, the ultrasound signal can be electrically focused to thereby improve sensitivity.

Focusing ultrasound signals includes transmit focusing and receive focusing. In the transmit focusing, the transmit order of the ultrasound signals transmitted from each of the transducer elements is determined by a distance difference between each of the transducer elements and the focusing point. As such, the ultrasound signals transmitted from each of the transducer elements, which contribute to a single transmitting/receiving of the ultrasound signals (i.e., formation of one scan line), are simultaneously added at one focusing point in phase. This causes the amplitude of the transmitting ultrasound signals (i.e., ultrasound beams) to peak. In the receive focusing, each of the ultrasound signals reaching the transducer elements are subject to time-delay. This allows the ultrasound signals reflected from the focusing point to be in phase. Many focusing points are required to improve the resolution of the ultrasound image. Further, to produce one ultrasound image, there must be a repetition of the same signal processing procedures for all the focusing points, which deteriorates the frame rate.

To solve the above-described problem, dynamic receive focusing was used wherein transmit focusing points were fixed and receive focusing points were increased, which allowed the ultrasound signals to be finely focused. In the dynamic receive focusing, the transmit focusing points are fixed so that the resolution of the ultrasound image can be improved. As an alternative measure, there was proposed a method of using all transmit focusing signals of adjacent transmit scan lines to acquire ultrasound data of the transmit scan lines.

Further, to improve the lateral resolution of the ultrasound image and the signal-to-noise ratio (SNR), it is ideal to direct the received signal obtained from all transducer elements (channels) contributed to a single reception of the ultrasound signals to a beam former. This implements synthetic aperture imaging (SAI) at a full frame rate, wherein the received signal constitutes more proper radio frequency (RF) data obtained from the received signal. To achieve this, however, it is necessary to simultaneously form low resolution images (LRIs) corresponding to all scan lines and update high resolution images (HRIs), which are already formed by using each of the LRIs. To do this, the received signals must be corresponded at all transducer elements, which are contributed to the single reception of the ultrasound signals, to each of the scan lines, thereby significantly increasing hardware complexity.

SUMMARY

It is an object of the present disclosure to provide an ultrasound system and method of forming ultrasound data corresponding to each receive scan line independent of a synthetic aperture.

An aspect of the present disclosure encompasses an ultrasound system configured to transmit ultrasound signals to a target object and receive ultrasound echo signals reflected therefrom to thereby form ultrasound data. In one embodiment, by way of non-limiting example, the ultrasound system comprises an ultrasound data forming unit having a plurality of receive channels, which is configured to form a plurality of receive scan lines based on the ultrasound echo signals. The ultrasound data forming unit is configured to: form scan line data corresponding to each of the receive scan lines by using data provided thereto from the receive channels; accumulate the scan line data corresponding to the receive scan lines of the same position to form accumulated data; set a storing start position for storing the accumulated data based on a transmit synthesis number; store the accumulated data by shifting the storing start position by one; and form ultrasound data corresponding to each of the receive scan lines.

Another aspect of the present disclosure encompasses a method for use in a system including a storing unit with a plurality of storage areas and a plurality of receive channels. In another embodiment, the method for transmitting ultrasound signals to a target object and receiving ultrasound echo signals reflected therefrom to form ultrasound data, comprises the steps of: (a) forming scan line data corresponding to each of the plurality of receive scan lines based on data provided from the plurality of receive channels; (b) setting a storing start position in the plurality of storage areas based on the transmit synthesis number; (c) storing the scan line data as accumulated data in corresponding storage area of the storing start position by reference to the storing start position; (d) forming new scan line data corresponding to each of the receive scan lines based on data newly provided from the receive channels; (e) shifting the storing start position in the storage area to set a new storing start position; (f) storing new accumulated data, which are obtained by the accumulation of the accumulated data stored in the storage area and the new scan line data, in corresponding storage area of the new storing start position by reference to the new storing start position; and (g) repeating the steps (c) to (f) to form the ultrasound data corresponding to each of the receive scan lines based on the new accumulated data.

BRIEF DESCRIPTION OF THE DRAWINGS

FIG. 10 is an illustrative diagram showing an ultrasound data forming unit in accordance with still yet another embodiment of the present disclosure.

DETAILED DESCRIPTION

A detailed description may be provided with reference to the accompanying drawings.

Figure 1:
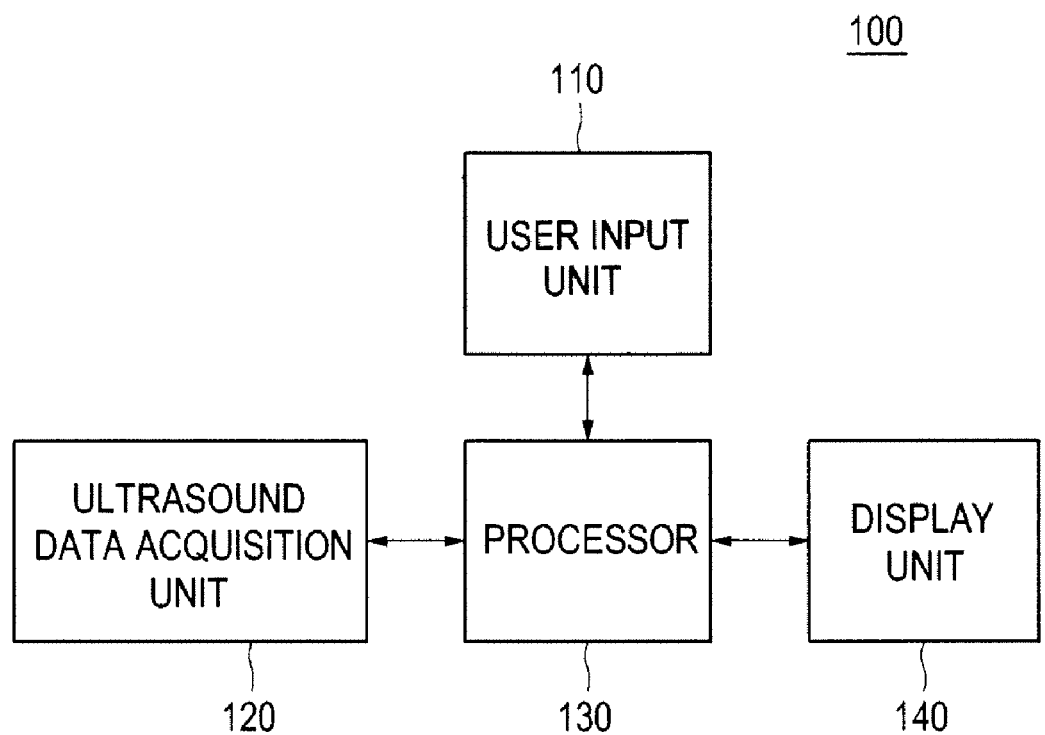
FIG. 1 is a block diagram showing the architecture of an ultrasound system in accordance with one embodiment of the present disclosure.

FIG. 1 is a block diagram showing the architecture of an ultrasound system in accordance with one embodiment of the present disclosure which embodies the methods of the present invention. Referring to FIG. 1, the ultrasound system 100 may include a user input unit 110, an ultrasound data acquisition unit 120, a processor 130 and a display unit 140.

The user input unit 110 may receive information input by a user. In the embodiment, the input information may include transmit (Tx) synthesis information. The Tx synthesis information may include information related to the number of scan lines (receive scan lines) to be simultaneously formed by transmitting ultrasound signals once. The user input unit 110 may include a control panel, a mouse, a key board, etc.

The ultrasound data acquisition unit 120 may transmit the ultrasound signals to a target object and receive ultrasound signals (i.e., ultrasound echo signals) reflected therefrom to thereby acquire ultrasound data. The ultrasound data acquisition unit 120 will be described in more detail with reference to FIG. 2.

Figure 2:
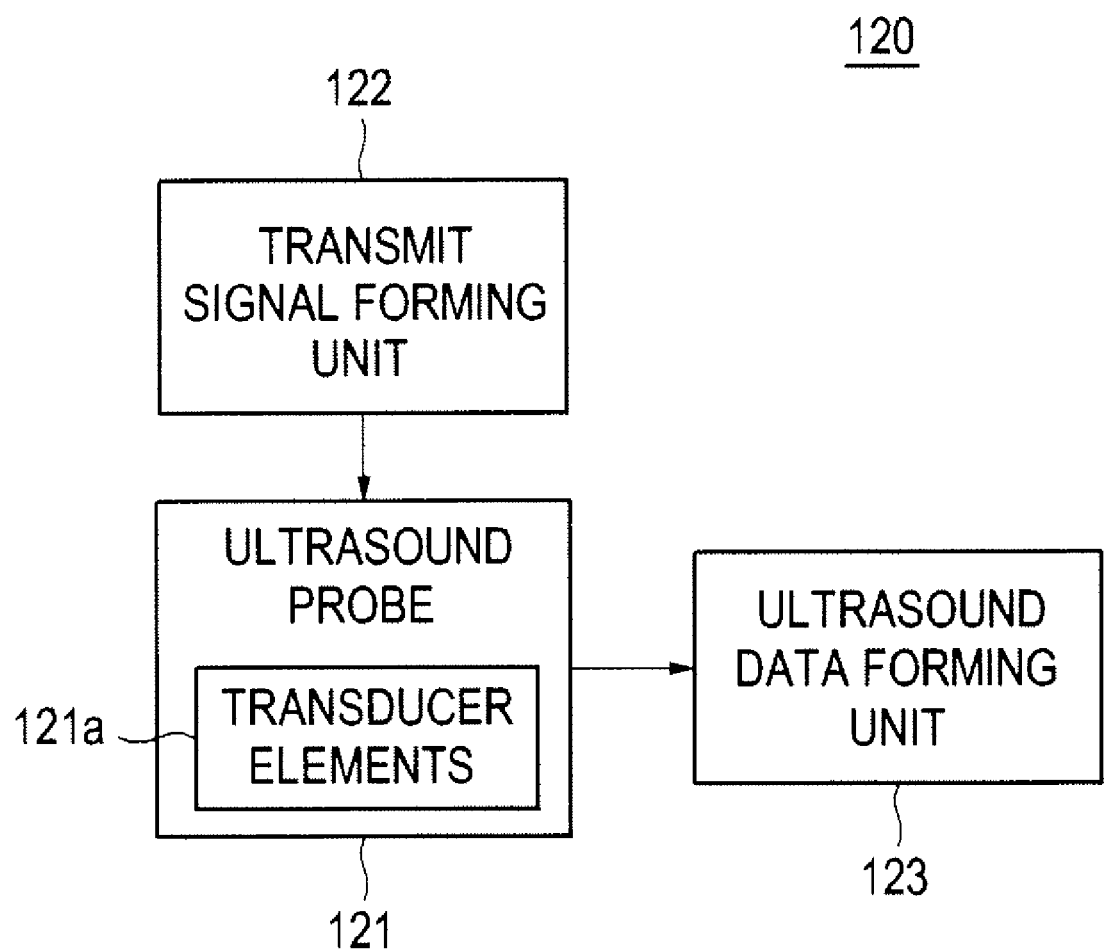
FIG. 2 is a detailed block diagram showing an ultrasound data acquisition unit shown in FIG. 1 in accordance with the embodiment of the present disclosure.

FIG. 2 is a detailed block diagram showing the ultrasound data acquisition unit shown in FIG. 1 in accordance with the embodiment of the present disclosure. Referring to FIG. 2, the ultrasound data acquisition unit 120 may include an ultrasound probe 121, a transmit signal forming unit 122 and an ultrasound data forming unit 123.

The ultrasound probe 121 may include a plurality of transducer elements 121a, which allows electrical signals and ultrasound signals to be interchangeable. The ultrasound probe 121 may convert the electrical signals (hereinafter referred to as transmit signals) provided thereto from the transmit signal forming unit 122 into the ultrasound signals to be transmitted to the target object. The ultrasound probe 121 may receive ultrasound echo signals reflected from the target object to form the electrical signals (hereinafter referred to as receive signals), wherein the electrical signals are analog signals.

The transmit signal forming unit 122 may form the transmit signals in view of the position of the transducer elements 121a and focusing points. In the embodiment, the transmit signal forming unit 122 may include a transmit focus delay memory (not shown) for storing therein delay patterns of the ultrasound signals to be transmitted to the target object through the transducer elements 121a. Thus, the ultrasound signals transmitted from each of the transducer elements 121a are focused along the scan lines (hereinafter referred to as transmit (Tx) scan lines) to form an ultrasound beam.

The ultrasound data forming unit 123, which is responsive to the received signals provided thereto from the ultrasound probe 121, may perform analog-to-digital conversion on the received signals to form digital data. The ultrasound data forming unit 123 may also form ultrasound data of each of the scan lines (hereinafter referred to as receive (Rx) scan lines) corresponding to the Tx scan lines based on the digital data input thereto. The ultrasound data forming unit 123 may be implemented by at least one application specific integrated circuit (ASIC) having a plurality of receive channels (not shown) as its inputs (i.e., a plurality of inputs).

Figure 3:
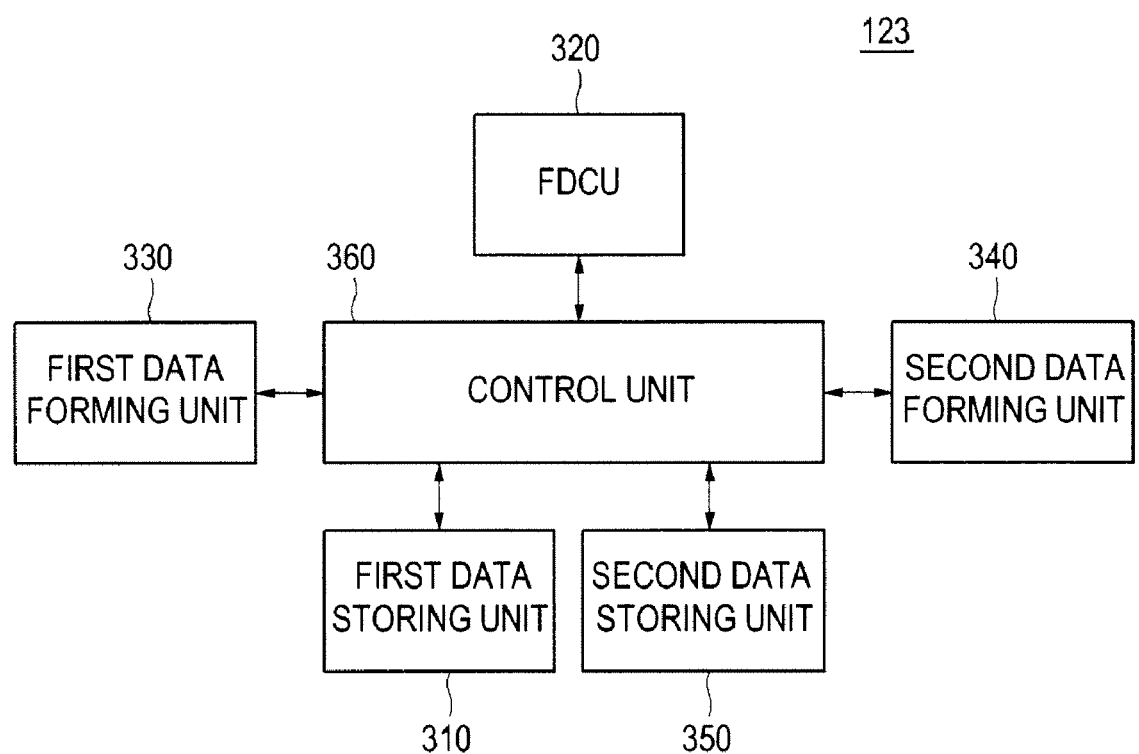
FIG. 3 is a detailed block diagram showing an ultrasound data forming unit shown in FIG. 2 in accordance with the embodiment of the present disclosure.

FIG. 3 is a detailed block diagram showing the ultrasound data forming unit shown in FIG. 2 in accordance with the embodiment of the present disclosure. Referring to FIG. 3, the ultrasound data forming unit 123 may include a first data storing unit 310, a focusing delay calculation unit (FDCU) 320, a first data forming unit 330, a second data forming unit 340, a second data storing unit 350 and a control unit 360. The ultrasound data forming unit 123 may further include an amplifying unit (not shown) configured to amplify the analog received signals provided thereto from the ultrasound probe 121, as well as an analog-to-digital convert (ADC) (not shown) configured to convert the analog amplified received signals into digital data.

The first data storing unit 310 may store the digital data provided thereto from a plurality of receive channels (not shown) therein. In the embodiment, the first data storing unit 310 may include a plurality of storage areas (not shown), each of which corresponding to each of the receive channels on a one-to-one basis and storing therein digital data corresponding thereto.

The FDCU 320 may store a receive delay curve lookup table, which is used in receive-focusing the digital data in view of positions of the transducer elements 121a and focusing points.

In general, the ASIC (the ultrasound data forming unit 123) may require receive delay curve lookup tables by the number of input channels (i.e., number of receive channels serviced by ASIC) in receive-focusing the digital data stored in the first data storing unit 310 to form one receive scan line. In the case of simultaneously forming the plurality of receive scan lines with a single transmission of the ultrasound signals, the ASIC may require receive delay curve lookup tables, which correspond to (number of receive channels serviced by ASIC)× (number of receive scan lines simultaneously formed). In this case, the ASIC may include a minimum number of receive delay curve lookup tables in view of the capacity of the ASIC.

Thus, to minimize the number of the receive delay curve lookup tables, the receive delay curve lookup tables required for the plurality of receive scan lines simultaneously formed, may be shared. In case the receive scan lines simultaneously formed in the ASIC are placed adjacent to each other and are disposed at regular intervals on the transducer elements 121a of the ultrasound probe 121, the receive delay curve lookup tables of the adjacent receive scan lines may be shared with each other.

For example, the simultaneously-formation of 32 receive scan lines through the use of digital data of 32 receive channels requires 1024 (32×32) receive delay curve lookup tables. Alternatively, sharing the receive delay curve lookup tables of adjacent receive scan lines allows the number of the receive delay curve lookup table to be reduced. Assuming that all of the receive scan lines are disposed on the transducer elements 121a of the ultrasound probe 121 at regular intervals, $M^{th}$ receive scan line may be in a curve on which receive delay curve of $(M-1)^{th}$ receive scan line is shifted by one. In other words, if the distance between the $(M^{-1})^{th}$ receive scan line and the receive channels is $-15, -14, \ldots, -0, 1, \ldots, 15, 16$, then the distance between the $M^{th}$ receive scan line and the receive channels is $-16, -15, -14, \ldots, 0, 1, \ldots, 14, 15$ and the position of the $(M-1)^{th}$ receive scan line [−15 to 16] is shifted to the right by one in the $M^{th}$ receive scan line. This allows a new position [−16] to be produced. As described above, the receive delay curve lookup tables for the $M^{th}$ receive scan line may share 31 of the receive delay curves used in the $(M-1)^{th}$ receive scan line. As such, it is only necessary to add one table to 32 receive delay curve lookup tables required for $(M-1)^{th}$ receive scan line for focus of $M^{th}$ receive scan line. As such, in the case of forming 32 receive scan lines, the required number of the scan delay curve lookup tables may be derived from (number of receive channels serviced by ASIC)+((number of receive scan lines simultaneously formed)−1).

Based on the receive delay curve lookup tables stored in the FDCU 320, the first data forming unit 330 may time-delay the digital data stored in the first data storing unit 310 and simultaneously form data (hereinafter referred to as scan line data) corresponding to each of the receive scan lines.

The second data forming unit 340 may accumulate scan line data corresponding to the receive scan lines of the same position among the scan line data provided thereto from the first data forming unit 330, thereby producing accumulated data.

The second data storing unit 350 may store the accumulated data produced at the second data forming unit 340 therein in a sliding manner. The sliding manner will be described below. In the embodiment, the second data storing unit 350 may include a plurality of storage areas (not shown) for storing the accumulated data therein.

The control unit 360 may set a storage start position of the data (i.e., accumulated data) based on the input information (i.e., transmit synthesis information) provided thereto from the user input unit 110. The control unit 360 may control the storage of the scan line data and the formation of the ultrasound data. Furthermore, the control unit 360 may control the storage of the digital data and the formation of the scan line data.

A description will be made with reference to FIGS. 4 and 5 as to an example for forming ultrasound data corresponding to the receive scan lines by using the ultrasound data forming unit having a plurality of receive channels as its input, when 5 receive scan lines are simultaneously formed with respect to one transmit scan line (i.e., when the number of transmit synthesis is 5).

Figure 4:
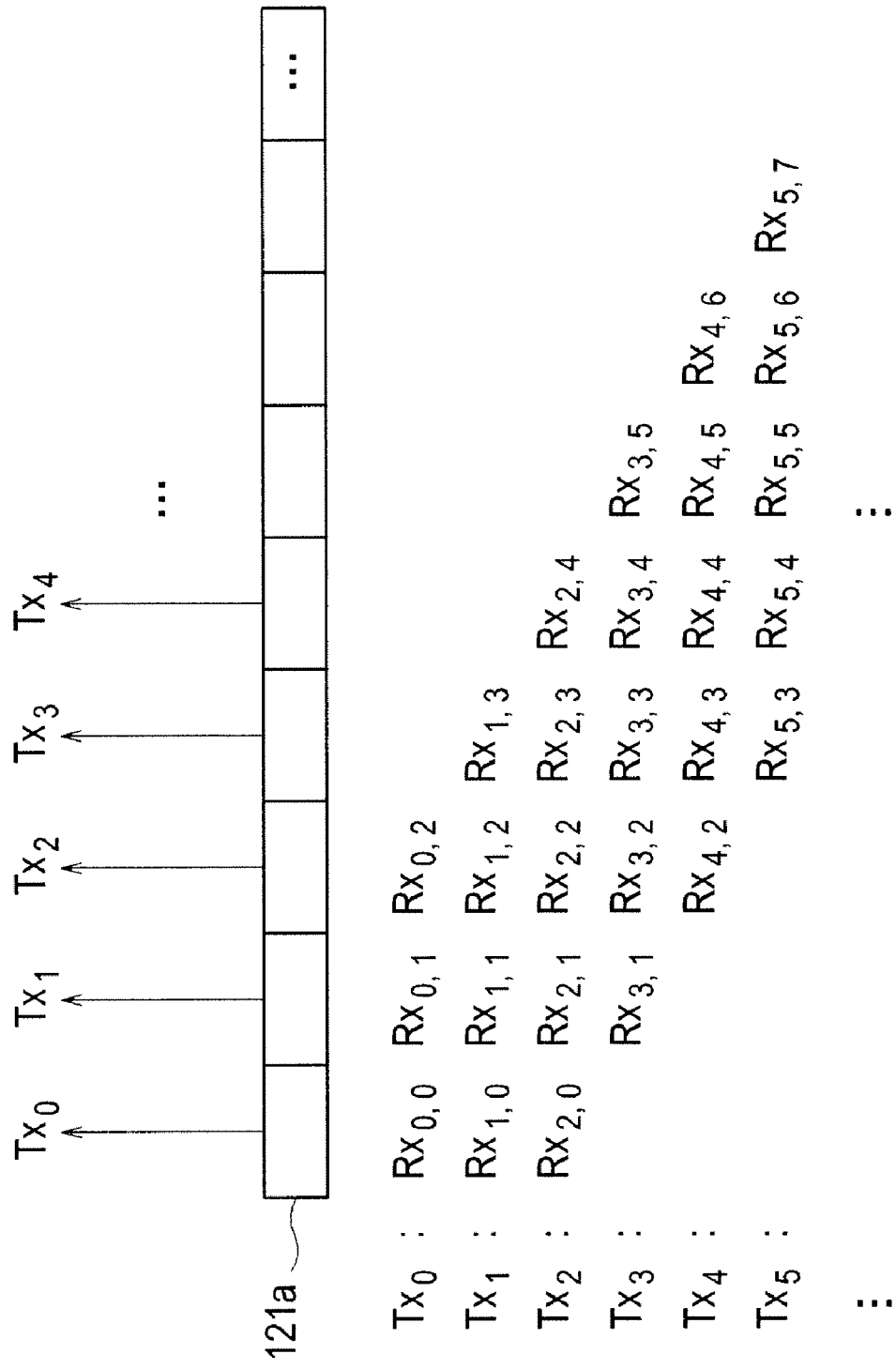
FIG. 4 is an illustrative diagram showing transmit scan lines and receive scan lines in accordance with an embodiment of the present disclosure.

FIG. 4 is an illustrative diagram showing transmit scan lines and receive scan lines in accordance with an embodiment of the present disclosure. FIG. 5 is an illustrative diagram showing the formation of ultrasound data in accordance with an embodiment of the present disclosure.

The ultrasound probe 121 transmits ultrasound signals to a target object along a first transmit scan line $Tx_0$ and receives ultrasound echo signals reflected therefrom. A plurality of digital data is provided from each of the receive channels. The plurality of digital data is stored in a storing area (not shown) corresponding thereto.

Based on the receive delay curve lookup tables stored in the FDCU 320, the first data forming unit 330 may apply receive-delays to the plurality of the digital data stored in the first data storing unit 310, thereby producing scan line data $Rx_{0,0}$, $Rx_{0,1}$ and $Rx_{0,2}$ of each of receive scan lines $Rx_0$ to $Rx_2$ corresponding to the first transmit scan line $Tx_0$.

The control unit 360 may set a first storing start position in the second data storing unit 350 based on the input information (i.e., transmit synthesis information) provided thereto from the user input unit 110. As an example, the control unit 360 may set the first storing start position (SSP) in the second data storing unit 350 by the following equation (1).

$$SSP = \text{round}(K/2) \qquad (1)$$

In the equation (1), round( ) denotes rounding off to the nearest whole number and K indicates the number of the transmit synthesis.

Figure 5:
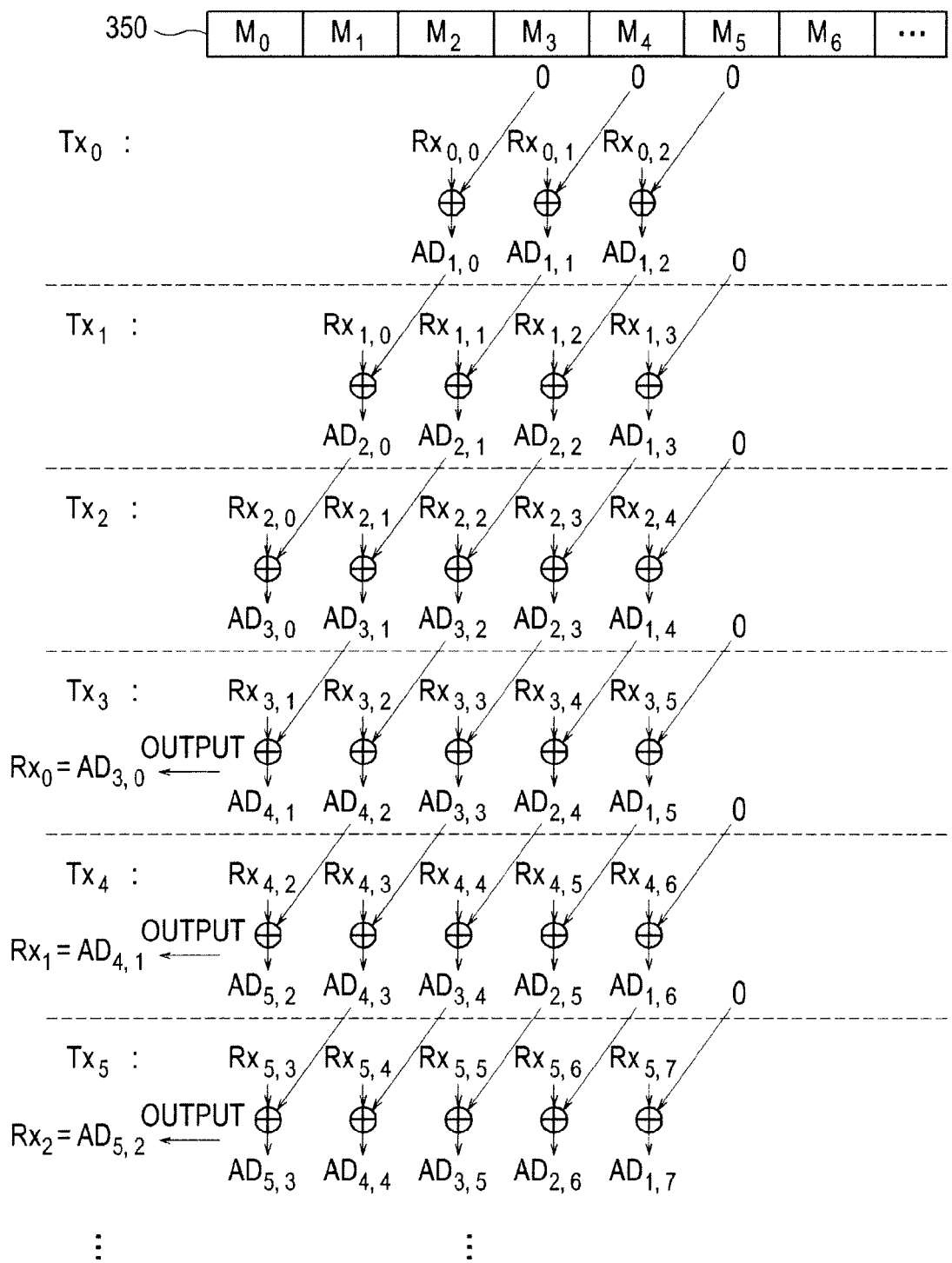
FIG. 5 is an illustrative diagram showing the formation of ultrasound data in accordance with an embodiment of the present disclosure.

That is, the control unit 360 may set the storing area $M_2$ corresponding to the storing start position (SSS=3=round(5/2)) with reference to the first storing area $M_0$ of the second data storing unit 350, as shown in FIG. 5.

The second data forming unit 340 may accumulate scan line data corresponding to the receive scan lines of the same position, among the scan line data provided therefrom, the first data forming unit 330 under the control of the control unit 360 to thereby produce accumulated data. That is, as to the receive scan lines of the same position, the second data forming unit 340 may accumulate the scan line data provided from the first data forming unit 330 with the accumulated data already stored in the second data storing unit 350, thereby forming new accumulated data.

More specifically, the second data forming unit 340 may accumulate the scan line data $Rx_{0,0}$ provided thereto from the first data forming unit 330 with the accumulated data already stored in a storing area $M_3$ of the second data storing unit 350 by reference to a first storing start position $M_2$, thereby producing accumulated data $AD_{1,0}$. In this case, the accumulated data already stored in the storing area $M_3$ may be a stored predetermined value (0). In $Ad_{i,j}$, i indicates an accumulated number and j indicates position of the receive scan lines. The accumulated data $AD_{1,0}$ is stored in a storing area of the second data storing unit 350, i.e., storing area $M_2$ corresponding to the first storing start position under the control of the control unit 360.

The second data forming unit 340 may accumulate the scan line data $Rx_{0,1}$ provided thereto from the first data forming unit 330 with accumulated data already stored in a storing area $M_4$ of the second data storing unit 350, thereby producing new accumulated data $AD_{1,1}$. The accumulated data $AD_{1,1}$ is stored in the storing area $M_3$ of the second data storing unit 350 by reference to the first start storing start position $M_2$ under the control of the control unit 360.

The second data forming unit 340 may accumulate the scan line data $Rx_{0,2}$ provided thereto from the first data forming unit 330 with accumulated data already stored in a storing area $M_5$ of the second data storing unit 350, thereby producing accumulated data $AD_{1,2}$. The accumulated data $AD_{1,2}$ is stored in the storing area $M_4$ of the second data storing unit 350 by reference to the first storing start position $M_2$ under the control of the control unit 360.

Next, the ultrasound probe 121 transmits ultrasound signals to the target object along a second transmit scan line $Tx_0$ and receives ultrasound echo signals reflected therefrom. A plurality of digital data is provided from each of the receive channels. The plurality of digital data is stored in a storing area (not shown) corresponding thereto.

Based on the receive delay curve lookup tables stored in the FDCU 320, the first data forming unit 330 may apply receive-delays to the plurality of the digital data stored in the first data storing unit 310 to thereby form scan line data $Rx_{1,0}$, $Rx_{1,1}$, $Rx_{1,2}$ and $Rx_{1,3}$ of each of receive scan lines $Rx_0$, $Rx_1$, $Rx_2$ and $Rx_3$ corresponding to a second transmit scan line $Tx_1$.

The control unit 360 may set the storing area $M_1$, which is shifted to the left by one, by reference to the first storing start position $M_2$ of the second data storing unit 350 as a new storing start position (hereinafter referred to as a second storing start position).

Under the control of the control unit 360, the second data forming unit 340 may accumulate scan line data corresponding to the receive scan lines of the same position to thereby form accumulated data. More specifically, the second data forming unit 340 may accumulate each of the scan line data $Rx_{1,0}$, $Rx_{1,1}$, $Rx_{1,2}$ and $Rx_{1,3}$ provided thereto from the first data forming unit 330 with each of the accumulated data $AD_{1,0}$, $AD_{1,1}$, $AD_{1,2}$ and 0 already stored in each of the storing areas $M_2$, $M_3$, $M_4$ and $M_5$ by reference to the second storing start position $M_1$ of the second data storing unit 350, thereby producing new accumulated data $AD_{2,0}$, $AD_{2,1}$, $AD_{2,2}$ and $AD_{1,3}$. Each of the new accumulated data $AD_{2,0}$, $AD_{2,1}$, $AD_{2,2}$ and $AD_{1,3}$ is stored in each of the storing areas $M_1$ to $M_4$ corresponding thereto by reference to the second storing start position $M_1$.

Next, the ultrasound probe 121 transmits ultrasound signals to the target object along a third transmit scan line $Tx_2$ and receives ultrasound echo signals reflected therefrom. A plurality of digital data is provided from each of the receive channels. The plurality of digital data is stored in a storing area (not shown) corresponding thereto.

Based on the receive delay curve lookup tables stored in the FDCU 320, the first data forming unit 330 may apply receive-delays to the digital data stored in the first data storing unit 310 to thereby form scan line data $Rx_{2,0}$, $Rx_{2,1}$, $Rx_{2,2}$, $Rx_{2,3}$ and $Rx_{2,4}$ of each of receive scan lines $Rx_0$, $Rx_1$, $Rx_2$, $Rx_3$ and $Rx_4$ corresponding to the third transmit scan line $Tx_2$.

The control unit 360 may set the storing area $M_0$, which is shifted to the left by one, by reference to the second storing start position $M_1$ of the second data storing unit 350 as a new storing start position (hereinafter referred to as a third storing start position).

Under the control of the control unit 360, as to the receive scan lines of the same position, the second data forming unit 340 may accumulate each of the scan line data $Rx_{2,0}$, $Rx_{2,1}$, $Rx_{2,2}$, $Rx_{2,3}$ and $Rx_{2,4}$ provided thereto from the first data forming unit 330 with each of the accumulated data $AD_{2,0}$, $AD_{2,1}$, $AD_{2,2}$, $AD_{1,3}$ and 0 already stored in each of the storing areas $M_1$, $M_2$, $M_3$, $M_4$ and $M_5$ by reference to the third storing start position $M_0$ of the second data storing unit 350, thereby producing new accumulated data $AD_{3,0}$, $AD_{3,1}$, $AD_{3,2}$, $AD_{2,3}$ and $AD_{1,4}$. The formed accumulated data $AD_{3,0}$, $AD_{3,1}$, $AD_{3,2}$, $AD_{2,3}$ and $AD_{1,4}$ are stored in the storing areas $M_0$ to $M_4$ based on the third storing start position $M_0$ under the control of the control unit 360.

Next, the ultrasound probe 121 transmits ultrasound signals to the target object along a fourth transmit scan line $Tx_3$ and receives ultrasound echo signals reflected therefrom. A plurality of digital data is provided from each of the receive channels. Each of the plurality of digital data is stored in a corresponding storing area (not shown) of the first data storing unit 310.

Based on the receive delay curve lookup tables stored in the FDCU 320, the first data forming unit 330 may apply receive-delays to the digital data stored in the first data storing unit 310 to thereby form scan line data $Rx_{3,1}$, $Rx_{3,2}$, $Rx_{3,3}$, $Rx_{3,4}$ and $Rx_{3,5}$ of each of the receive scan lines $Rx_1$, $Rx_2$, $Rx_3$, $Rx_4$ and $Rx_5$ corresponding to the fourth transmit scan line $Tx_3$.

Since the third storing start position of the second data storing unit 350 is the first storing area $M_0$, no further setting on a new storing start position is performed at the control unit 360.

Under the control of the control unit 360, as to the receive scan lines of the same position, the second data forming unit 340 may accumulate each of the scan line data $Rx_{3,1}$, $Rx_{3,2}$, $Rx_{3,3}$, $Rx_{3,4}$ and $Rx_{3,5}$ provided thereto from the first data forming unit 330 with each of the accumulated data $AD_{3,1}$, $AD_{3,2}$, $AD_{2,3}$, $AD_{1,4}$ and 0 already stored in each of the storing areas $M_0$ to $M_5$ by reference to the third storing start position $M_0$ of the second data storing unit 350, thereby producing new accumulated data $AD_{4,1}$, $AD_{4,2}$, $AD_{3,3}$, $AD_{2,4}$ and $AD_{1,5}$. Each of the new accumulated data $AD_{4,1}$, $AD_{4,2}$, $AD_{3,3}$, $AD_{2,4}$ and $AD_{1,5}$ is stored in each of storing areas $M_0$ to $M_4$ corresponding thereto by reference to the third storing start position $M_0$ under the control of the control unit 360. In this case, the accumulated data $AD_{3,0}$ is outputted as the ultrasound data corresponding to the receive scan line $Rx_0$, without further storing in the second data storing unit 350.

Next, the ultrasound probe 121 transmits ultrasound signals to the target object along a fifth transmit scan line $Tx_4$ and receives ultrasound echo signals reflected therefrom. A plurality of digital data is provided from each of the receive channels. Each of the digital data is stored in a corresponding storing area (not shown) of the first data storing unit 310.

Based on the receive delay curve lookup tables stored in the FDCU 320, the first data forming unit 330 may apply receive-delays to the digital data stored in the first data storing unit 310 to thereby form scan line data $Rx_{4,2}$, $Rx_{4,3}$, $Rx_{4,4}$, $Rx_{4,5}$ and $Rx_{4,6}$ of each of receive scan lines $Rx_2$, $Rx_3$, $Rx_4$, $Rx_5$ and $Rx_6$ corresponding to the fifth transmit scan line $Tx_4$.

Since the third storing start position of the second data storing unit 350 is the first storing area $M_0$, no further setting on a new storing start position is performed at the control unit 360.

Under the control of the control unit 360, as to the receive scan line of the same position, the second data forming unit 340 may accumulate each of the scan line data $Rx_{4,2}$, $Rx_{4,3}$, $Rx_{4,4}$, $Rx_{4,5}$ and $Rx_{4,6}$ provided thereto from the first data forming unit 330 with each of the accumulated data $AD_{4,1}$, $AD_{4,2}$, $AD_{3,3}$, $AD_{2,3}$, $AD_{1,5}$ and 0 already stored in each of the storing areas $M_0$ to $M_5$ by reference to the third storing start position $M_0$ of the second data storing unit 350, thereby producing new accumulated data $AD_{5,2}$, $AD_{4,3}$, $AD_{3,4}$, $AD_{2,5}$ and $AD_{1,6}$. Each of the new accumulated data $AD_{5,2}$, $AD_{4,3}$, $AD_{3,4}$, $AD_{2,5}$ and $AD_{1,6}$ is stored in each of the storing area $M_0$ to $M_4$ by reference to the third storing start position $M_0$ under the control of the control unit 360. In this case, the accumulated data $AD_{4,1}$ is outputted as the ultrasound data corresponding to the receive scan line $Rx_1$ without further storing in the second data storing unit 350.

The ultrasound data forming unit 123 may produce ultrasound data $AD_{5,2}$, $AD_{5,3}$, . . . corresponding to each of the receive scan lines $Rx_2$, $Rx_3$, . . . by repeating the above-mentioned procedures.

Figure 6:
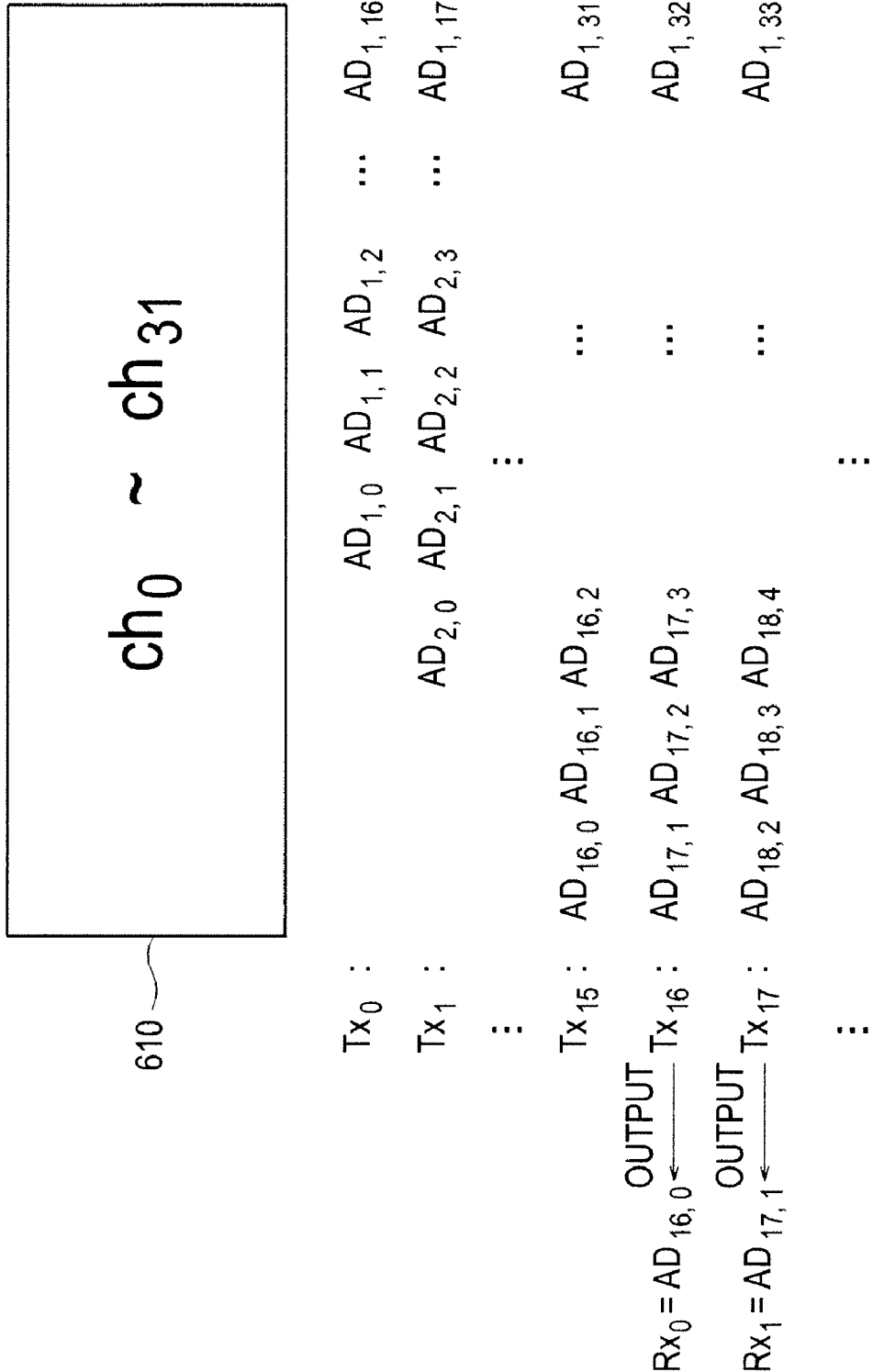
FIG. 6 is an illustrative diagram showing an ultrasound data forming unit in accordance with another embodiment of the present disclosure.

FIG. 6 is an illustrative diagram showing the ultrasound data forming unit in accordance with an embodiment of the present disclosure. Referring to FIG. 6, the ultrasound data forming unit 123 may have 32 receive channels $ch_0$ to $ch_{31}$ as its inputs. In order words, the ultrasound data forming unit 123 may include an ASIC 610 with 32 inputs.

As shown in FIG. 3, the ASIC 610 may include the first data storing unit 310, the FDCU 320, the first data forming unit 330, the second data forming unit 340, the second data storing unit 350 and the control unit 360.

The ASIC 610 may set a storing start position (SSP=16) of the second data storing unit 350 based on a transmit synthesis number (K=32) and shift to the left by one the storing start position of the second data storing unit 350 with respect to each of the transmit scan lines every transmission of the ultrasound signals. The ASIC 610 may accumulate scan line data corresponding to the receive scan lines of the same position to thereby produce accumulated data. Next, each of the accumulated data, which is produced by reference to the storing start position, is stored in a corresponding storing area of the second data storing unit 350.

Thus, if the scan line data corresponding to the receive scan lines of the same position are accumulated (i.e., synthesized) by (transmit synthesis number/2) or the transmit synthesis number, and no storing area to be further shifted in the second data storing unit 350 is detected, then the ASIC 610 may output accumulated data $AD_{16,0}$, $AD_{17,0}$, $AD_{18,0}$, . . . output from the second data storing unit 350 as ultrasound data corresponding to each of the receive scan lines $Rx_0$, $Rx_1$, $Rx_2$, . . . .

In accordance with the embodiment, in case the ultrasound data of the receive scan lines is formed with the help of the ASIC 610 having 32 receive channels as its inputs, the number of the ASIC may be increased by the transmit synthesis number rather than the number of the total receive scan lines. This allows further simple implementations of the ultrasound data forming unit 123 over the prior art.

Figure 7:
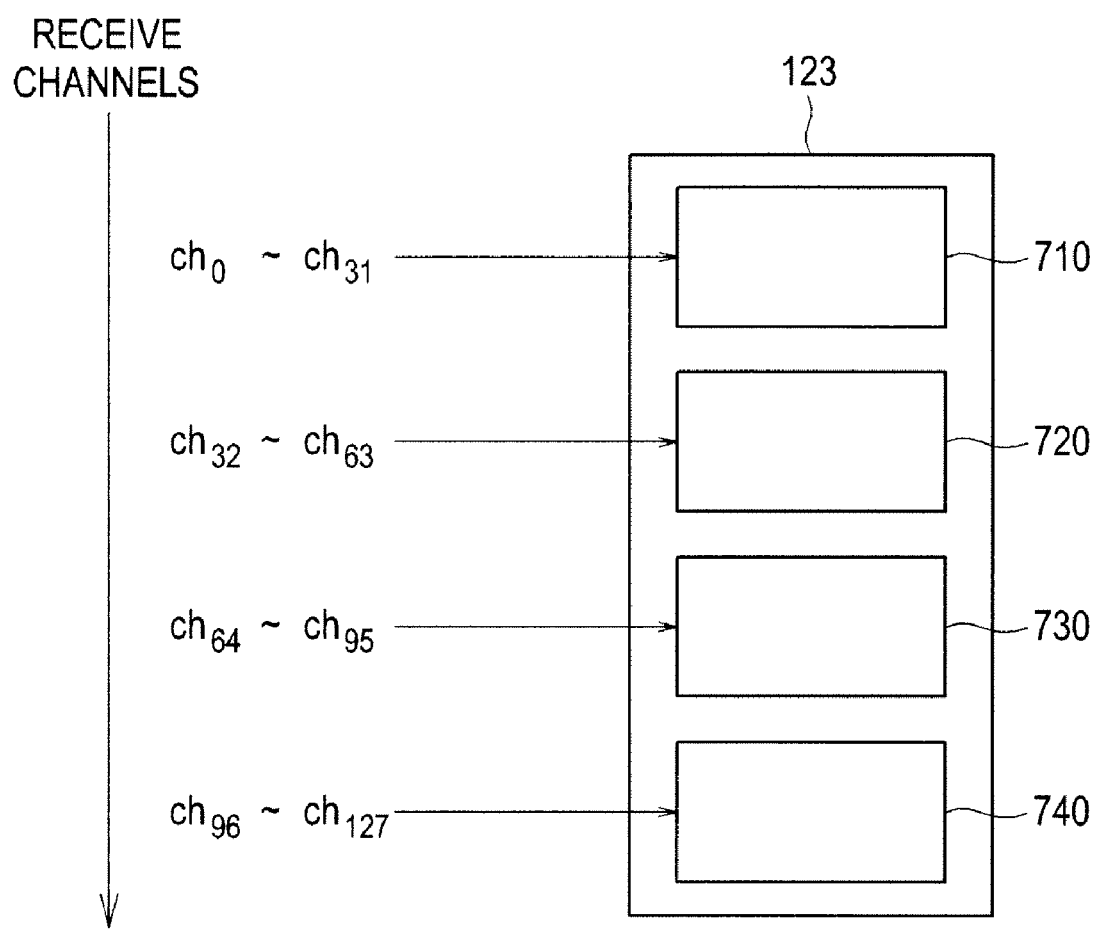
FIG. 7 is an illustrative diagram showing an ultrasound data forming unit in accordance with yet another embodiment of the present disclosure.

Even though the embodiment has been described with respect to the ultrasound data forming unit 123 having 32 receive channels as its inputs (i.e., 32 inputs), in another embodiment, the ultrasound data forming unit 123 may have 128 receive channels as its inputs (i.e., 128 inputs), as shown in FIG. 7. In this case, the ultrasound data forming unit 123 may include first to fourth ASICs 710 to 740, each of which has 32 receive channels as its inputs. Also, each of the first to fourth ASICs 710 to 740 may include the first data storing unit 310, the FDCU 320, the first data forming unit 330, the second data forming unit 340, the second data storing unit 350 and the control unit 360, as shown in FIG. 3.

Figure 8:
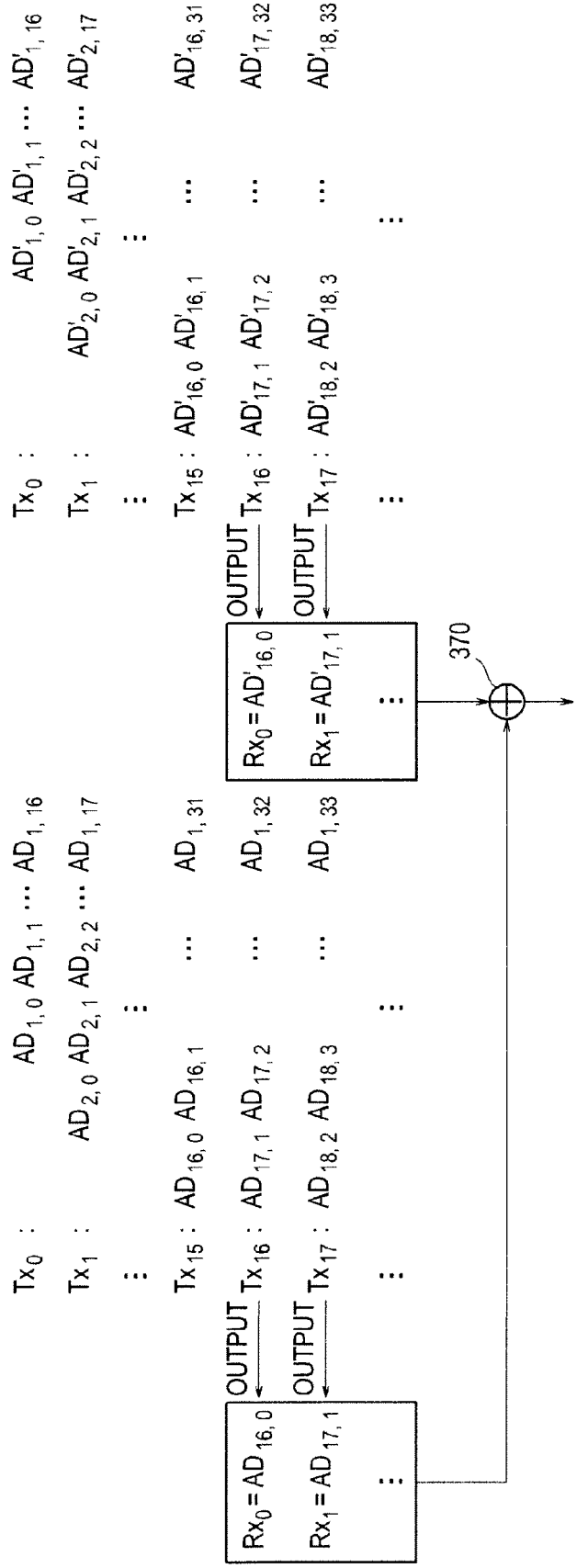
FIG. 8 is an illustrative diagram showing an ultrasound data forming unit in accordance with yet another embodiment of the present disclosure.

FIG. 8 is an illustrative diagram showing an ultrasound data forming unit in accordance with another embodiment of the present disclosure. Referring to FIG. 8, the ultrasound data forming unit 123 may include 64 receive channels $ch_0$ to $ch_{63}$ as its inputs, i.e., 64 inputs. The ultrasound data forming unit 123 may further include a first ASIC 810 and a second ASIC 820.

The first ASIC 810 may have 32 receive channels $ch_0$ to $ch_{31}$ as its inputs. The first ASIC 810 may include the first data storing unit 310, the FDCU 320, the first data forming unit 330, the second data forming unit 340, the second data storing unit 350 and the control unit 360, as shown in FIG. 3. The first ASIC 810 may further include an adding unit 370.

The first ASIC 810 may form ultrasound data $AD_{16,0}$, $AD_{17,1}$, . . . corresponding to the receive scan lines $Rx_0$, $Rx_1$, . . . based on the digital data provided thereto from the receive channels $ch_0$ to $ch_{31}$, as described above.

The second ASIC 820 may have 32 receive channels $ch_{31}$ to $ch_{63}$ as its inputs. The second ASIC 820 may include the first data storing unit 310, the FDCU 320, the first data forming unit 330, the second data forming unit 340, the second data storing unit 350 and the control unit 360, as shown in FIG. 3. The second ASIC 820 may further include the adding unit 370.

The second ASIC 820 may form ultrasound data $AD'_{16,0}$, $AD'_{17,1}$, . . . corresponding to the receive scan lines $Rx_0$, $Rx_1$, . . . based on the digital data provided thereto from the receive channels $ch_{31}$ to $ch_{63}$. The second ASIC 820 may add the ultrasound data $AD_{16,0}$, $AD_{17,1}$, . . . provided thereto from the first ASIC 810 and the ultrasound data $AD'_{16,0}$, $AD'_{17,1}$, . . . provided thereto from the second ASIC 820 through the help of the adding unit 370, thereby outputting the ultrasound data corresponding to the receive scan lines $Rx_0$, $Rx_1$, . . . . At this time, the adding unit 370 may perform an addition on ultrasound data corresponding to the receive scan lines of the same position.

Even though the embodiment has been described for the addition of the ultrasound data from the first ASIC 810 and the ultrasound data from the second ASIC 820 at the adding unit 370 of the second ASIC 820, in another embodiment, the addition of the ultrasound data from the first ASIC 810 and the ultrasound data from the second ASIC 820 may be performed at the adding unit 370 of the first ASIC 810.

Figure 9:
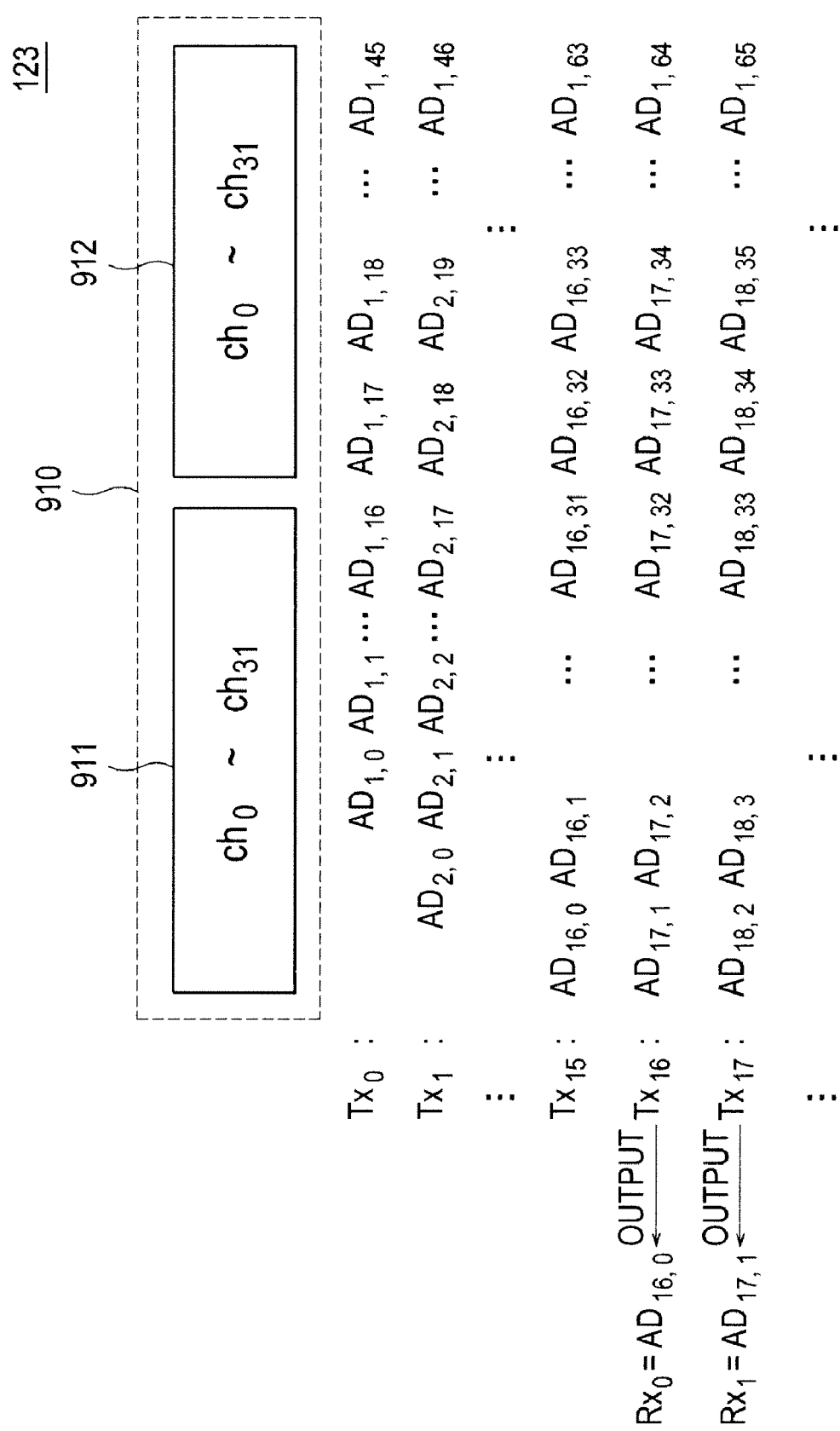
FIG. 9 is an illustrative diagram showing an ultrasound data forming unit in accordance with still yet another embodiment of the present disclosure.

FIG. 9 is an illustrative diagram showing an ultrasound data forming unit in accordance with yet another embodiment of the present disclosure. The ultrasound data forming unit 123 may define an ASIC group 910 having a plurality of ASICs based on the transmit synthesis number.

As an example, each of the first and second ASICs 911 and 912 may have 32 receive channels $ch_0$ to $ch_{31}$ as its inputs and simultaneously form 32 receive scan lines, then the ultrasound data forming unit 123 may define the ASIC group 910 having the first and second ASICs 911 and 912 based on the transmit synthesis number (K=64), as shown in FIG. 9. Herein, each of the first and second ASICs 911 and 912 may include the first data storing unit 310, the FDCU 320, the first data forming unit 330, the second data forming unit 340, the second data storing unit 350 and the control unit 360, as shown in FIG. 3.

The ultrasound data forming unit 123 may allocate indexes $M_0$ to $M_{31}$ to the storing areas of the second data storing unit 350 in the first ASIC 911 and allocate indexes $M_{32}$ to $M_{63}$ to the storage areas of the second data storing unit 350 in the second ASIC 912. Thus, the ultrasound data forming unit 123 may form the ultrasound data of the receive scan lines in a sliding manner, as shown in FIG. 9.

FIG. 10 is an illustrative diagram showing an ultrasound data forming unit in accordance with still yet another embodiment of the present disclosure. The ultrasound data forming unit 123 may define a plurality of ASIC groups based on the number of receive channels and the transmit synthesis number.

As an example, when the number of the receive channels is 64 and each of the first to fourth ASICs 1011, 1012, 1021 and 1022 has 32 receive channels $ch_0$ to $ch_{31}$ as its inputs to simultaneously form 32 receive scan lines, the ultrasound data forming unit 123 may define a first ASIC group 1010 and an second ASIC group 1020 based on the transmit synthesis number (K=64), as shown in FIG. 10.

The first ASIC group 1010 may have 32 receive channels $ch_0$ to $ch_{31}$ as its inputs. The first ASIC group 1010 may include the first ASIC 1011 and the second ASIC 1012. Herein, each of the first ASIC 1011 and the second ASIC 1012 may have 32 receive channels $ch_0$ to $ch_{31}$ as its inputs and may include the first data storing unit 310, the FDCU 320, the first data forming unit 330, the second data forming unit 340, the second data storing unit 350 and the control unit 360, as shown in FIG. 3. Each of the first ASIC 1011 and the second ASIC 1012 may further include the adding unit 370. The first ASIC group 1010 may form the ultrasound data $AD_{16,0}$, $AD_{17,1}$, ... corresponding to the receive scan lines $Rx_0$, $Rx_1$, ..., as described above.

The second ASIC group 1020 may have 32 receive channels $ch_{32}$ to $ch_{63}$ as its inputs. The second ASIC group 1020 may include the third ASIC 1021 and the fourth ASIC 1022. Herein, each of the third ASIC 1021 and the fourth ASIC 1022 may have 32 receive channels $ch_{32}$ to $ch_{63}$ as its inputs and may include the first data storing unit 310, the FDCU 320, the first data forming unit 330, the second data forming unit 340, the second data storing unit 350 and the control unit 360, as shown in FIG. 3. Each of the third ASIC 1021 and the fourth ASIC 1022 may further include the adding unit 370. The second ASIC group 1020 may form the ultrasound data $AD'_{16,0}$, $AD'_{17,1}$, ... corresponding to the receive scan lines $Rx_0$, $Rx_1$, ..., as described above. The second ASIC group 1020 may add the ultrasound data $AD_{16,0}$, $AD_{17,1}$, ... provided thereto from the first ASIC group 1010 and the ultrasound data $AD'_{16,0}$, $AD'_{17,1}$, ... provided thereto from the second ASIC group 1020 through the use of the adding unit 370 of the third ASIC 1021 to thereby output ultrasound data corresponding to the receive scan lines $Rx_0$, $Rx_1$, .... At this time, the adding unit 370 may add ultrasound data corresponding to the receive scan lines of the same position.

Even though the embodiment has been described for the addition of the ultrasound data from the first ASIC group 1010 and the ultrasound data from the second ASIC group 1020 at the adding unit 370 of the third ASIC 1021, in another embodiment, the addition of the ultrasound data from the first ASIC group 1010 and the ultrasound data from the second ASIC group 1020 may be performed at the adding unit 370 of at least one of the first to fourth ASICs 1011 to 1022.

Referring back to FIG. 1, the processor 130 may be connected with the user input unit 110 and the ultrasound data acquisition unit 120. The processor 130 may process the ultrasound data provided thereto from the ultrasound data acquisition unit 120 to form an ultrasound image. The display unit 140 may display the ultrasound image formed at the processor 130.

Although embodiments have been described with reference to a number of illustrative embodiments thereof, it should be understood that numerous other modifications and embodiments can be devised by those skilled in the art that will fall within the spirit and scope of the principles of this disclosure.

As an example, even though, in the above embodiments, setting of data storing start positions by the sliding manner are performed based on the transmit synthesis information provided from the user input unit 110, in another embodiment, automatic setting of the transmit synthesis number allows the data storing start positions to be set by the sliding manner based on the transmit synthesis number set.

Since the ultrasound data corresponding to each of the receive scan lines may be formed independent of the synthetic aperture as described above, the ultrasound system in accordance with the present disclosure will be implemented with low cost and low complexity.

What is claimed is:

1. An ultrasound system of forming ultrasound data, comprising:
an ultrasound data forming unit having a plurality of receive channels as input and being configured to
form scan line data corresponding to each of a plurality of receive scan lines based on data provided from the receive channels;
accumulate the scan line data corresponding to the receive scan lines of a same position to form accumulated data;
set a storing start position for storing the accumulated data based on a transmit synthesis number;
store the accumulated data by shifting the storing start position by one; and
form ultrasound data corresponding to each of the receive scan lines based on the accumulated data.

2. The ultrasound system of claim 1, wherein the transmit synthesis number is the number of the receive scan lines to be simultaneously formed in a single transmission of the ultrasound signals.

3. The ultrasound system of claim 2, wherein the ultrasound data forming unit includes:
a first data storing unit configured to store the data provided from the receive channels;
a focusing delay calculation unit (FDCU) configured to store receive delay curve lookup tables for receive-focusing the data stored in the first data storing unit;
a first data forming unit configured to receive-focus the data stored in the first data storing unit based on the receive delay curve lookup tables to form the scan line data corresponding to each of the receive scan lines;
a second data forming unit configured to accumulate the scan line data corresponding to the receive scan lines of the same position to form the accumulated data;
a second data storing unit including a plurality of storage areas, the second data storing unit being configured to store the accumulated data in the storage areas; and
a control unit configured to shift the storage area for storing the accumulated data by one based on a first storage area of the storage area at every transmission of the ultrasound signals to set the storing start position.

4. The ultrasound system of claim 3, wherein the ultrasound data forming unit is configured to output the accumulated data outputted from the first storage area of the second data storing unit at every transmission of the ultrasound signals as the ultrasound data corresponding to each of the receive scan lines.

5. The ultrasound system of claim 3, wherein the FDCU is configured to share the receive delay curve lookup tables required in forming the scan line data corresponding to each of the receive scan lines.

6. The ultrasound system of claim 3, wherein the ultrasound data forming unit is configured to be implemented by at least one application specific integrated circuit (ASIC).

7. The ultrasound system of claim 6,
wherein the ultrasound data forming unit further includes:
a first ASIC having N receive channels as input and being configured to form a first ultrasound data corresponding to each of the receive scan lines based on data provided from the N receive channels, wherein N is an integer; and
a second ASIC having M receive channels as inputs and being configured to form a second ultrasound data corresponding to each of the receive scan lines based on data provided from the M receive channels, and add the first and second ultrasound data of the receive scan lines of the same positions, to form the ultrasound data, wherein M is the same integer as N.

8. The ultrasound system of claim 7, wherein the first and second ASICs further include an adding unit for adding the first ultrasound data and the second ultrasound data.

9. The ultrasound system of claim 6, wherein the ultrasound data forming unit is configured to set at least one ASIC group based on the transmit synthesis number, wherein the ASIC group includes at least two ASICs.

10. A method of forming ultrasound data, comprising:
(a) forming scan line data corresponding to each of a plurality of receive scan lines based on data provided from a plurality of receive channels;
(b) accumulating the scan line data corresponding to the receive scan lines of a same position to form accumulated data
(c) setting a storing start position for storing the accumulated data in storage areas of a storage unit based on a transmit synthesis number:
(d) storing the accumulated data by shifting the storing start position by one; and
(e) forming ultrasound data corresponding to each of the receive scan lines based on the accumulated data.

11. The method of claim 10, wherein the transmit synthesis number is the number of the receive scan lines to be simultaneously formed by a signal transmission of ultrasound signals.

12. The method of claim 11, wherein the step (c) includes:
setting the storing start position by reference to a first storage area of the storage areas by using the following equation:

Storing start position=round(transmit synthesis number/2)

wherein round( ) indicates rounding off to the closest whole number.

13. The method of claim 12, wherein the step (a) includes:
storing the data provided from the receive channels in a data storing unit; and
receive-focusing the data stored in the data storing unit based on receive delay curve lookup tables to form the scan line data corresponding to each of the receive scan lines, and
wherein the step (b) includes:
accumulating the scan line data corresponding to the receive scan lines of the same position to form the accumulated data.

14. The method of claim 12, wherein the step (d) includes shifting the storage area for the accumulated data by one based on a first storage area of the storage areas at every transmission of the ultrasound signals.

15. The method of claim 12, wherein the step (e) includes:
storage areas, then outputting the accumulated data output as the ultrasound data outputting the accumulated data outputted from the first storage area at every transmission of the ultrasound signals as the ultrasound data corresponding to each of the receive scan lines.

* * * * *